US 7,956,908 B2

(12) United States Patent
Kim

(10) Patent No.: US 7,956,908 B2
(45) Date of Patent: Jun. 7, 2011

(54) READ-OUT CIRCUIT OF IMAGE SENSOR

(75) Inventor: Nam-Ryeol Kim, Chungcheongbuk-do (KR)

(73) Assignee: Crosstek Capital, LLC, Wilmington, DE (US)

( * ) Notice: Subject to any disclaimer, the term of this patent is extended or adjusted under 35 U.S.C. 154(b) by 1323 days.

(21) Appl. No.: 11/222,133

(22) Filed: Sep. 7, 2005

(65) Prior Publication Data

US 2006/0061675 A1    Mar. 23, 2006

(30) Foreign Application Priority Data

Sep. 8, 2004    (KR) .................. 10-2004-0071566

(51) Int. Cl.
*H04N 5/217*    (2011.01)
*H04N 9/64*     (2006.01)
*H04N 3/14*     (2006.01)
*H04N 5/335*    (2011.01)

(52) U.S. Cl. .................. 348/241; 348/242; 348/308
(58) Field of Classification Search .......... 348/308, 348/241, 242
See application file for complete search history.

(56) References Cited

U.S. PATENT DOCUMENTS

| | | | |
|---|---|---|---|
| 4,535,257 A * | 8/1985 | Hareyama ............ 327/89 |
| 4,553,052 A * | 11/1985 | Takahashi ............ 327/65 |
| 5,229,848 A * | 7/1993 | Sugasawa ............ 348/264 |
| 5,471,515 A * | 11/1995 | Fossum et al. ....... 377/60 |
| 6,118,115 A | 9/2000 | Kozuka et al. |
| 6,320,617 B1 * | 11/2001 | Gee et al. ............ 348/302 |
| 6,366,320 B1 * | 4/2002 | Nair et al. ............ 348/300 |
| 6,529,237 B1 * | 3/2003 | Tsay et al. ............ 348/241 |
| 6,803,766 B2 * | 10/2004 | Kobayashi et al. .... 324/434 |
| 6,985,030 B2 * | 1/2006 | Shimizu et al. ........ 330/9 |
| 7,277,130 B2 * | 10/2007 | Korthout et al. ...... 348/308 |
| 7,369,166 B2 * | 5/2008 | Fossum et al. ........ 348/308 |
| 7,382,407 B2 * | 6/2008 | Cho et al. ............ 348/296 |

(Continued)

FOREIGN PATENT DOCUMENTS

CN    1437392 A    8/2003

(Continued)

OTHER PUBLICATIONS

Japanese Office Action dated Aug. 31, 2010. (English translation provided).

*Primary Examiner* — Sinh Tran
*Assistant Examiner* — Christopher K Peterson
(74) *Attorney, Agent, or Firm* — McAndrews, Held & Malloy, Ltd.

(57) ABSTRACT

A read-out circuit of an image sensor is provided. The read-out circuit includes: a CDS block, including: a plurality of reset capacitors storing inputted reset values of pixels; a plurality of signal capacitors storing inputted signal values of the pixels; a plurality of reset driving devices outputting the reset values stored into the reset capacitors; a plurality of signal driving devices outputting the signal values stored into the signal capacitors; and a plurality of capacitor equalization devices equalizing electric potential levels of the reset capacitors and the signal capacitors; a reset line transferring reset value output signals of the CDS block; a signal line transferring signal value output signals of the CDS block; a differential amplification unit amplifying a difference between the individual reset value output signal and the individual signal value output signal; and a line equalization device equalizing electric potential levels of the reset line and signal line.

24 Claims, 11 Drawing Sheets

U.S. PATENT DOCUMENTS

| | | |
|---|---|---|
| 7,385,166 B2 * | 6/2008 | Fossum .................... 250/208.1 |
| 2001/0040212 A1 | 11/2001 | Mizuno |
| 2003/0193597 A1 * | 10/2003 | Fossum et al. ............... 348/308 |
| 2004/0051534 A1 * | 3/2004 | Kobayashi et al. ........... 324/429 |
| 2004/0201417 A1 * | 10/2004 | Shimizu et al. ................. 330/9 |

FOREIGN PATENT DOCUMENTS

| | | |
|---|---|---|
| CN | 1481147 A | 3/2004 |
| EP | 1271930 A2 | 1/2003 |
| EP | 1484912 A2 | 12/2004 |
| JP | 63-037711 | 2/1988 |
| JP | 10-126695 | 5/1998 |
| JP | 11-041526 | 2/1999 |
| JP | 2000-171296 | 6/2000 |
| JP | 2003-234962 | 8/2003 |

* cited by examiner

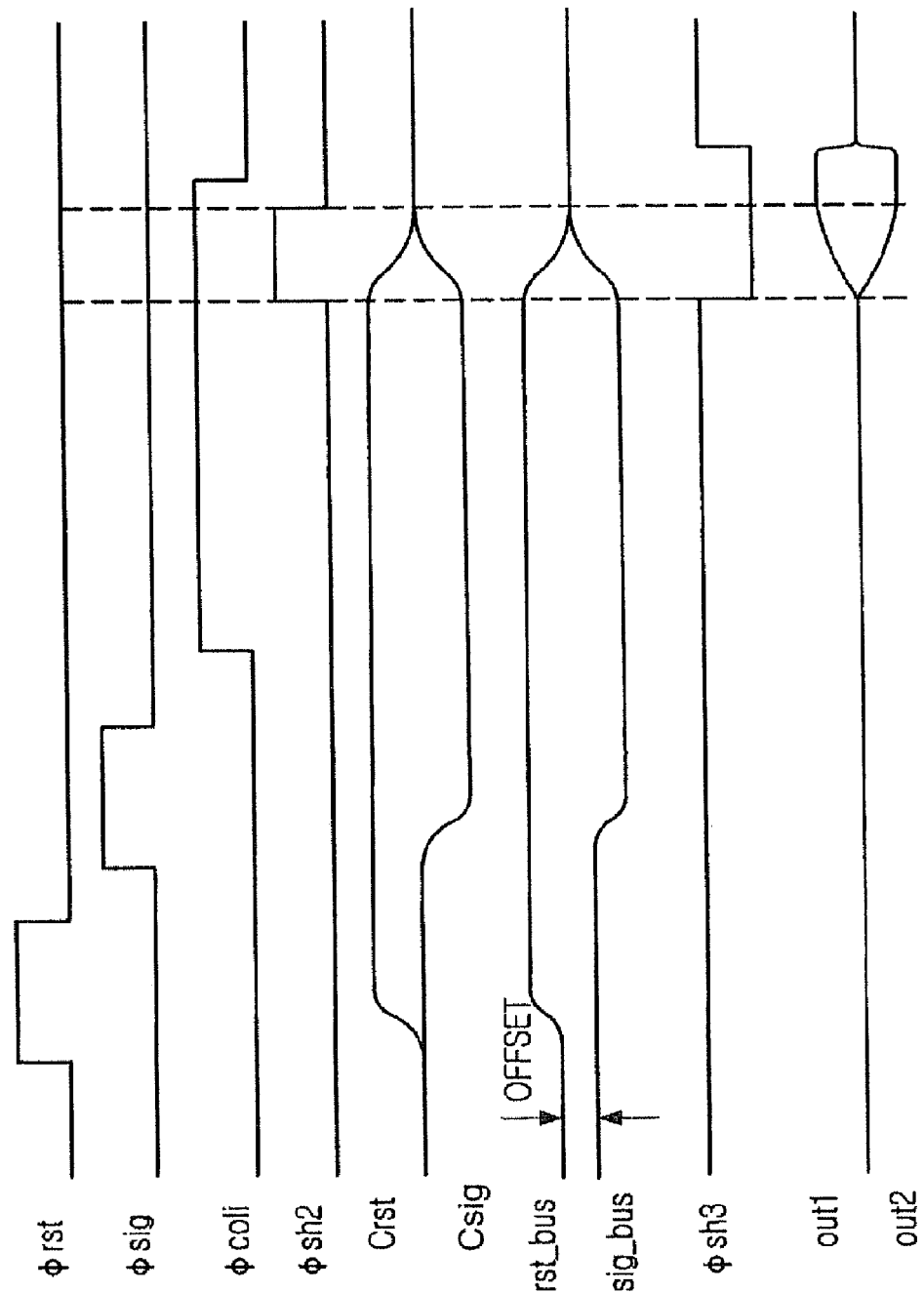

READ-OUT CIRCUIT OF IMAGE SENSOR

FIELD OF THE INVENTION

The present invention relates to an image sensor; and more particularly, to a read-out circuit of an image sensor for generating an electrical signal in proportion to a photo-sensed amount of light incident to a scanning type image sensor.

DESCRIPTION OF RELATED ARTS

In typical complementary metal oxide semiconductor (CMOS) image sensors, a procedure of reading out pieces of information sensed from pixels arranged in a horizontal line of a pixel array, which is often called a scan line, proceeds sequentially from the upper most line to the bottom most line. This read-out procedure is called a line scan mode.

FIG. 1 shows a part of a conventional CMOS image sensor for reading out sensed information. The CMOS image sensor includes: a pixel array 100 converting information on light into an analog electric signal; a correlated double sampling (CDS) unit 120 detecting an output signal from the pixel array; a programmable gain amplifier (PGA) unit 140 connected with the CDS via an analog bus and amplifying the detected signal from the CDS unit 120 into an intended level; and an analog-to-digital converter (ADC) 160 converting an analog signal into a digital signal.

With reference to FIG. 2, the conventionally employed line scan mode using a conventional read-out circuit of an image sensor will be described in detail.

In the pixel array 100, wherein pixels PIXEL generating charges in proportion to an amount of detected light are arranged in the form of an array, outputs of the individual pixels PIXEL included in the target scan line are transferred as reset values and signal values to the CDS unit 120 allocated around an edge portion of the pixel array 100 through corresponding column lines. The reset values are output values obtained after the corresponding pixels PIXEL are reset and, the signal values are output values of the pixels PIXEL proportional to an amount of photosensitive light after being exposed to light for a predetermined time. The CDS unit 120 stores these two reset and signal values individually into separate capacitors. Since Φrst signals collecting the reset values and Φsig signals collecting the signal values are provided simultaneously to columns, pieces of information on the pixels PIXEL from the selected scan line are simultaneously stored into CDS modules of the CDS unit 120. According to Φcol signals, the reset values and the signal values are inputted through buffers BUF and then reset and signal lines to the PGA unit 140. The PGA unit 40 generates outputs each proportional to a difference between the individual reset value and the individual signal value.

However, the above-described conventional read-out circuit has several limitations.

First, if an offset voltage, which is a voltage difference existing even in the absence of an input, exists on the reset and signal lines, the PGA unit may generate output values proportional to an offset voltage. Second, in the reset line and the signal line, switches for the Φcol signals exist as many as the number of arrayed pixels in one directional line. However, these switches become a burden to the reset line and the signal line, thereby slowing down a signal response speed. Increasing operation capacitance of an individual buffer is one method of solving the above limitation in the switches. However, in such case, power dissipation may increase and a dynamic range of an output signal may decrease.

SUMMARY OF THE INVENTION

It is, therefore, an object of the present invention to provide a read-out circuit of an image sensor which can prevent an error caused by an offset voltage in an analog bus including a reset line and a signal line.

It is another object of the present invention to provide a read-out circuit of an image sensor which can improve a response speed of an analog bus and reducing power dissipation.

In accordance with an aspect of the present invention, there is provided a read-out circuit of an image sensor, including: a correlated double sampling (CDS) block, including; a plurality of reset capacitors storing inputted reset values of pixels; a plurality of signal capacitors storing inputted signal values of the pixels; a plurality of reset driving devices outputting the reset values stored into the reset capacitors; a plurality of signal driving devices outputting the signal values stored into the signal capacitors; and a plurality of capacitor equalization devices equalizing electric potential levels of the reset capacitors and the signal capacitors; a reset line transferring reset value output signals of the CDS block; a signal line transferring signal value output signals of the CDS block; a differential amplification unit amplifying a difference between the individual reset value output signal and the individual signal value output signal; and a line equalization device equalizing electric potential levels of the reset line and the signal line.

In accordance with another aspect of the present invention, there is provided a read-out circuit of an image sensor, including: a CDS block, including: a plurality of reset capacitors receiving reset values of pixels and storing the reset values; a plurality of signal capacitors receiving signal values of the pixels; a plurality of reset driving devices outputting the reset values stored into the reset capacitors; a plurality of signal driving devices outputting the signal values stored into the signal capacitors; and a plurality of capacitor equalization devices equalizing electric potential levels of the reset capacitors and the signal capacitors; a reset line transferring reset value output signals of the CDS block; a signal line transferring signal value output signals of the CDS block; and a differential amplification unit amplifying a difference between the individual reset value output signal and the individual signal value output signal.

In accordance with further aspect of the present invention, there is provided a read-out circuit of an image sensor, including: a CDS block storing and outputting reset values and signal values of pixels; a reset line transferring reset value output signals of the CDS block; a signal line transferring signal value output signals of the CDS block; a differential amplification unit amplifying a difference between the individual reset value output signal and the individual signal value output signal; and a line equalization device equalizing electric potential levels of the reset line and the signal line.

BRIEF DESCRIPTION OF THE DRAWINGS

The above and other objects and features of the present invention will become better understood with respect to the following description of the preferred embodiments given in conjunction with the accompanying drawings, in which:

FIG. 11 is a timing diagram showing control signals and output signals in the presence of an offset voltage in the read-out circuit illustrated in FIG. 10.

DETAILED DESCRIPTION OF THE INVENTION

Figure 1:
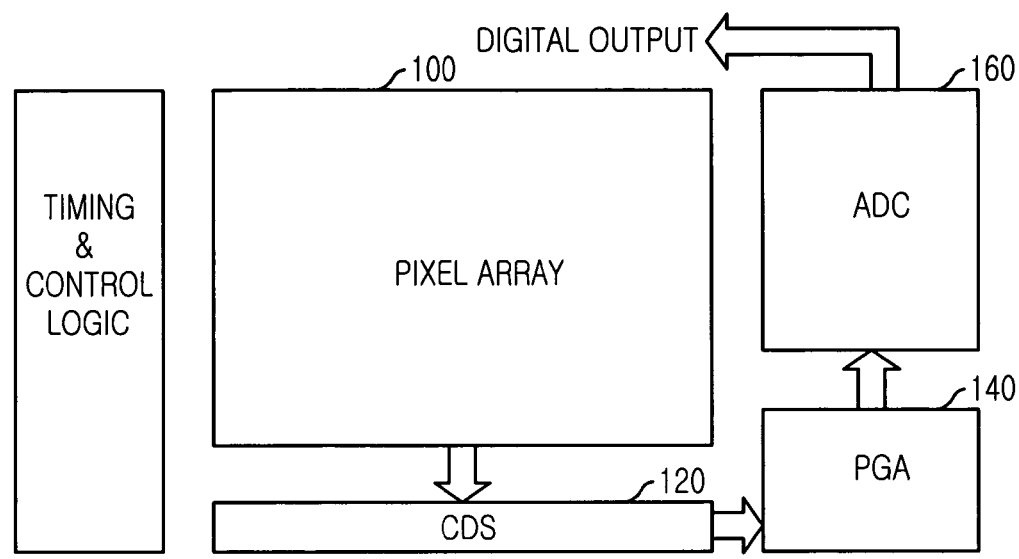
FIG. 1 is a simplified block diagram showing a conventional image sensor.
Figure 2:
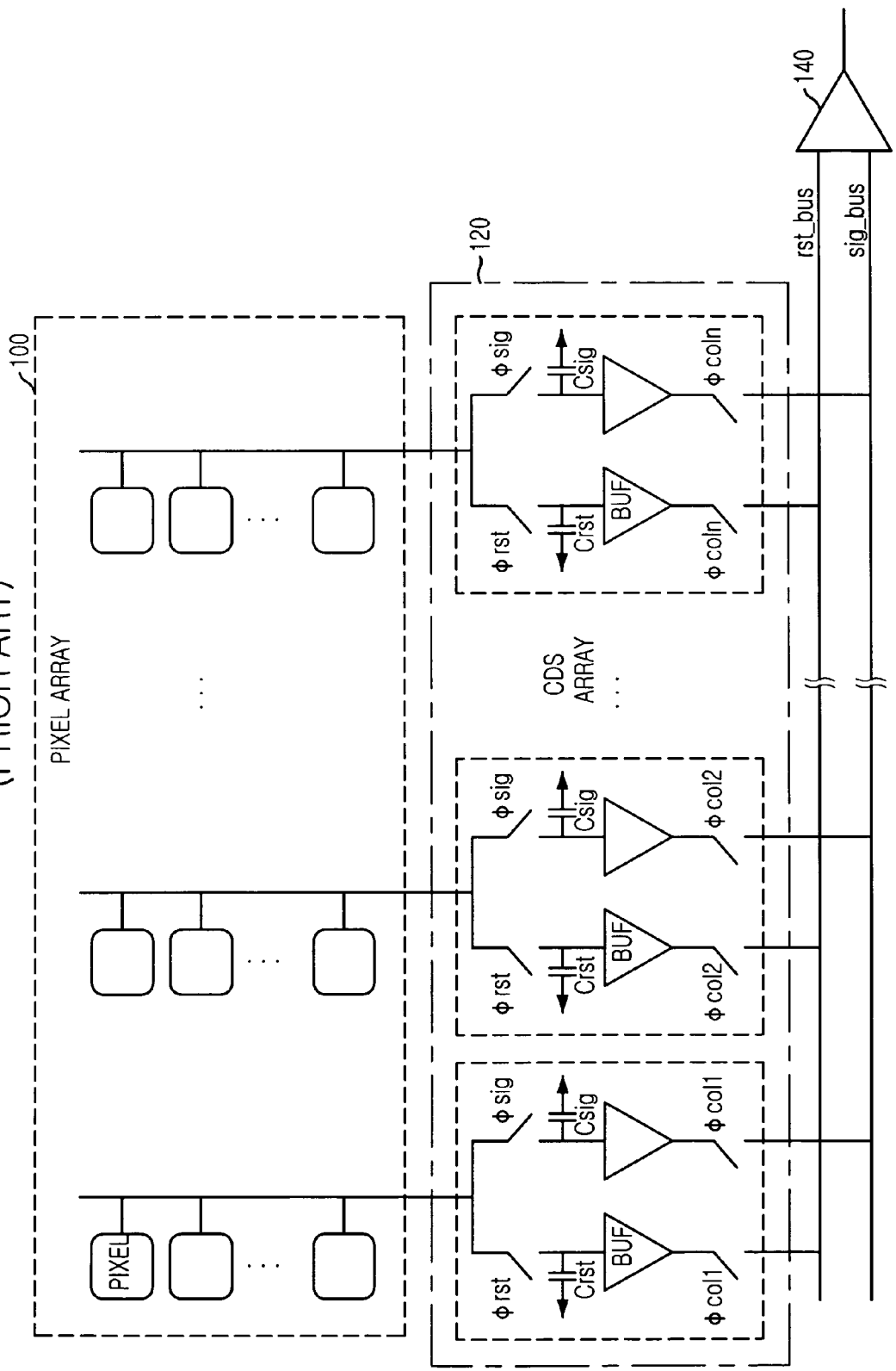
FIG. 2 is a detailed block diagram showing a conventional read-out circuit of an image sensor.

A read-out circuit of an image sensor in accordance with certain embodiments of the present invention will be described in detail with reference to the accompanying drawings. It should be noted that the same reference numerals are used for the same device elements even in different drawings.

Figure 3:
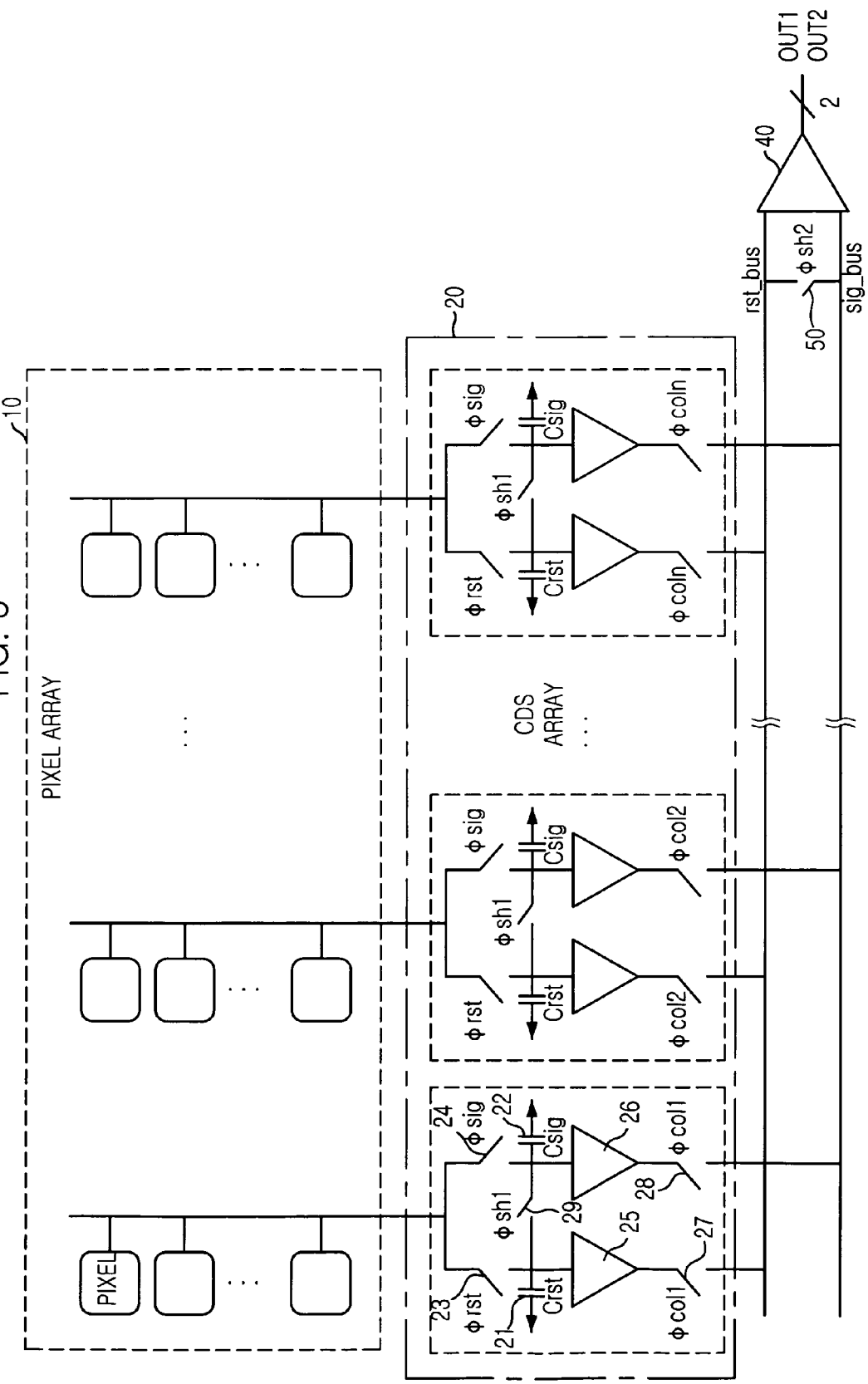
FIG. 3 is a detailed block diagram showing a read-out circuit of an image sensor in accordance with a first embodiment of the present invention.

FIG. 3 is a detailed block diagram showing a read-out circuit of an image sensor in accordance with a first embodiment of the present invention.

The read-out circuit of the image sensor includes a correlated double sampling (CDS) block 20. The CDS block 20 includes: a plurality of reset capacitors 21 storing inputted reset values of pixels PIXEL; a plurality of signal capacitors 22 storing inputted signal values of the pixels PIXEL; a plurality of reset buffers 25 outputting the reset values stored at the reset capacitors 21; a plurality of signal buffers 26 outputting the signal values stored at the signal capacitors 22; and a plurality of capacitor equalization switches 29 equalizing electric potentials of the reset capacitors 21 and the signal capacitors 22.

The read-out circuit of the image sensor further includes: a reset line on which reset value output signals of the CDS block 20 are loaded; a signal line on which signal value output signals of the CDS block 20 are loaded; a differential amplification unit 40 amplifying a difference between the individual reset value output signal and the individual signal value output signal; and a line equalization switch 50 equalizing electric potentials of the reset line and the signal line.

The above described embodiment of the present invention can be more effectively applied to an image sensor configured with a pixel array including complementary metal oxide semiconductor (CMOS) image sensor cells generating image data via line scan mode. However, a distinctive characteristic of the above embodiment lies on an analog bus and thus, the above described embodiment can be applied to other image sensor cells such as charge coupled devices (CCDs) as long as a specific structure that outputs image data through an analog bus requiring a fast response speed is implemented.

Preferably, the CDS block 20 can further include: a plurality of reset input switches 23 inputting reset values; a plurality of signal input switches 24 inputting signal values; a plurality of reset output switches 27 outputting the reset values; and a plurality of signal output switches 28 outputting the signal values.

Before an electrical shutter for a corresponding scan line is opened, the CDS block 20 receives the reset values, which are output values obtained when the pixels PIXEL of a selected scan line are reset and stores the reset values to the corresponding reset capacitors 21. Afterwards, the electrical shutter for the selected scan line is opened for a predetermined time, the CDS block 20 receives the signal values, which are output values corresponding to an amount of incident light to the corresponding pixels PIXEL, and stores the signal values to the corresponding signal capacitors 22. Each of the reset buffers 25 amplifies a current value of the signal stored into the individual reset capacitor 21 and preferably uses a source follower circuit including two N-channel metal oxide semiconductor (NMOS) transistors or two P-channel metal oxide semiconductor (PMOS) transistors. Each of the signal buffers 26 amplifies a current value of the signal stored into the individual signal capacitor 21 and preferably uses a source follower circuit including two NMOS transistors or two PMOS transistors.

The reset input switches 23, the signal input switches 24, the reset output switches 27 and the signal output switches 28 can be easily fabricated when these input and output switches 23, 24, 27, and 28 are configured with one or two MOS transistors.

The capacitor equalization switches 29 are configured preferably with one or two MOS transistors. If the selected capacitor equalization switch 29 is closed, the CDS block 20 outputs signals having the equalized electric potential level to two output lines (i.e., the reset line and the signal line). Each of the capacitor equalization switches 29 eliminates an offset voltage effect existing in the analog buses (i.e., the reset line and the signal line).

To eliminate the offset voltage effect caused by the capacitor equalization switches 29, the differential amplification unit 40 is not simply configured in a structure that amplifies a voltage difference between the two input values, but is preferably configured in a structure that amplifies a value obtained by subtracting a voltage difference of the two input values when the selected capacitor equalization switch 29 is turned on from a voltage difference of the two input values when the selected equalization switch 29 is turned off. For this configuration, the differential amplification unit 40 can be configured in a similar structure to the CDS block 20; that is, the differential amplification unit 40 is a typical differential amplifier unit for amplifying CDS modules and CDS outputs. The differential amplifier 40 can be configured in a structure which allows the two output values to be changed into values proportional or inversely proportional to electric potential values of the input values when the electric potentials of the input values are changed.

Figure 4:
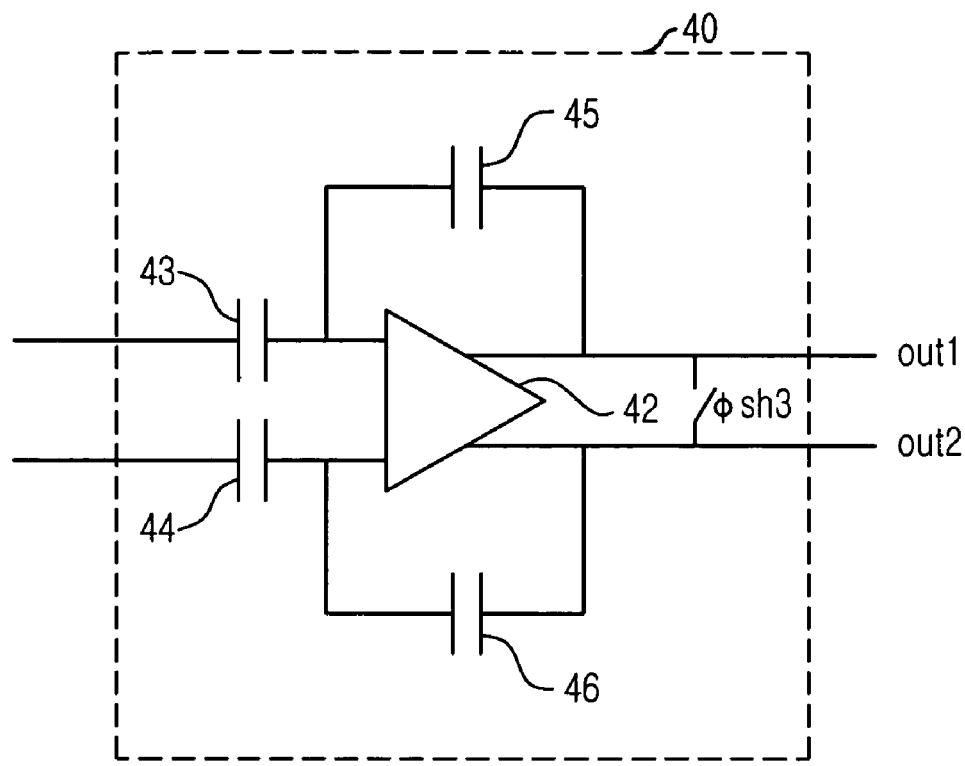
FIG. 4 is a circuit diagram showing a differential amplification unit of a read-out circuit of an image sensor in accordance with the first embodiment of the present invention.

FIG. 4 is a diagram showing one embodiment with a differential amplification unit in a read-out circuit of an image sensor in accordance with the first embodiment of the present invention. The differential amplification unit 40 is a sort of a switched capacitor integrator, including: a differential amplifier 42 provided with two input terminals and two output terminals; two input capacitors 43 and 44 connected individually to the two input terminals; two feedback capacitors 45 and 46 each connected between the individual input terminal and the individual output terminal. The differential amplification unit 40 outputs a value difference between two output signals out1 and out2 inversely proportional to a value difference between two input values of the two input capacitors 43 and 44 when the value difference between the two input values is changed. Since the output value of the differential amplification unit 40 is an analog value, this analog value is converted into a digital value through using an analog-to-digital converter (not shown). The converted digital value containing pixel data is inputted to other image processing devices.

Although one the line scan path including one reset line, one signal line and one differential amplification unit is exemplified in FIG. 4, more than two line scan paths or the certain number of the line scan paths same as the number of columns can be configured to obtain a faster processing speed. In the individual differential amplification unit, with regardless of the number of the line scan paths, the reset line on which the reset value is loaded and the signal line on which the signal value is loaded are connected to the input terminals, which are provided with a line equalization switch to increase a response speed of the reset line and the signal line.

The line equalization switch 50 is to improve a response speed of the analog buses (i.e., the reset line and the signal line). The CDS block 20 according to the first embodiment of the present invention includes CDS modules whose number is same as the number of the pixels PIXEL within one scan line and, a plurality of output signals of the CDS modules are outputted sequentially to a pair of analog buses in a temporal basis. Therefore, at a certain moment, one CDS module is connected with the pair of analog buses. For this selective connection of the CDS module, it is necessary to have a device to float other CDS modules from the analog buses. MOS transistor switches are typical examples for the floating device. However, when viewed from a source/drain of a certain NMOS transistor/PMOS transistor, capacitance generated at a parasitic capacitor becomes a load to the analog buses, thereby causing a decreased response speed of the analog buses when a predetermined change occurs at the connected CDS module. The line equalization switch 50 is disposed at the input terminal side of the differential amplification unit 40 and equalizes the analog buses directly at the moment of equalizing the output signals of the connected CDS module. As a result of this direct equalization, it is possible to improve the response speed of the analog buses.

The plurality of capacitor equalization switches 29 configured within the CDS modules of the CDS block 20 are to eliminate an offset voltage effect existing in the analog buses. On the basis of the reset buffers 25 and the signal buffers 26, the offset voltage existing within the illustrated image sensor can be classified into an offset voltage at a pixel side (hereinafter referred to as a first offset voltage) allocated in front of the reset buffers 25 and the signal buffers 26 and an offset voltage at an analog bus side (hereinafter referred to as a second offset voltage) allocated at the back side of the reset buffers 25 and the signal buffers 26. The first offset voltage reads out can be eliminated by reading out the reset values and the signal values separately and taking each difference between the individual reset value and the individual signal value as a pixel data.

The second offset voltage is usually generated by a mismatch event usually occurring when the reset buffers 25 and the signal buffers 26 are fabricated. Especially, the second offset voltage is an output voltage difference between the individual reset buffer 25 and the individual signal buffer 26 generated when the identical input voltage is applied to the reset buffers 25 and the signal buffers 26. In the presence of the second offset voltage, the differential amplification unit 40 generates an output value with the second offset voltage value. If the same level of the second offset voltage is generated at the CDS modules, the output values of the differential amplification unit 40 can be compensated by subtracting the second offset voltage from these output values. However, each CDS module has a different level of the second offset voltage. Hence, the differential amplification unit 40 illustrated in FIG. 4 is exemplified to eliminate the offset voltage and, the capacitor equalization switches 29 are individually provided to the CDS modules.

The differential amplification unit 40 illustrated in FIG. 4 generates a voltage difference between the output terminals in proportion to an incremental ratio (i.e., a derivative value) of each input terminal. Thus, when a voltage difference between the two input terminals is changed at a certain moment, the differential amplification unit 40 generates an output value in proportion to a changed level in the voltage difference between the two input terminals regardless of the offset voltage.

For the precise execution of the differential amplification unit 40, the offset voltages at the rest line and the signal line should not be artificially removed. Thus, each of the capacitor equalization switches 29 configured in a portion between the input terminals of the individual reset and signal buffers 25 and 26 generates an equalization signal. Using the line equalization switch 50 according to the first embodiment of the present invention causes the offset voltages of the analog buses to be eliminated artificially and thus, the differential amplification unit 40 generates inaccurate output values. Accordingly, control signals are controlled based on a timing diagram of FIG. 6 in order to prevent the generation of inaccurate output values.

Figure 5:
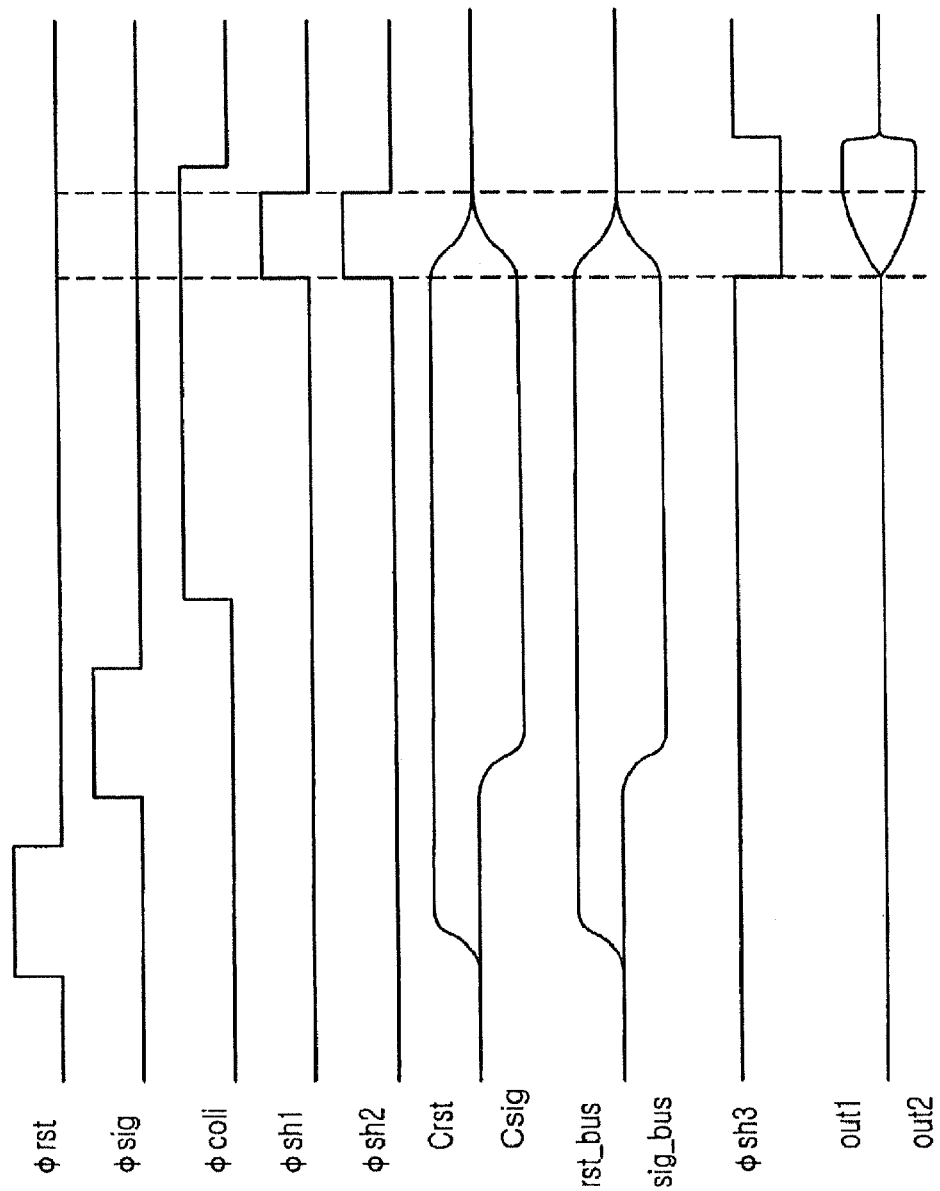
FIG. 5 is a timing diagram showing control signals and output signals in the absence of an offset voltage in the read-out circuit illustrated in FIG. 3.

FIG. 5 is a timing diagram showing individual signals related to operation of the read-out circuit of the image sensor in accordance with the first embodiment of the present invention. With reference to FIG. 5, the operation of the read-out circuit will be described in detail. The description of the operation is particularly focused on one scan line. However, depending on the implementation of the image sensor, the operation of each scan line can take place in a parallel or sequential manner or, similar to the pipe-line operation, the operation of each scan line can be overlapped with each other.

Prior to executing a sensing operation, pixels PIXEL of a corresponding scan line are reset to eliminate previously stored charges. A Φrst signal is activated to store outputted voltage levels of the reset pixels PIXEL, which are reset values (i.e., a sort of offset voltage values). Then, the reset input switches 23 are turned on in response to the Φrst signal and, the outputted voltage levels of the reset pixels PIXEL are stored into the reset capacitors 21 through the reset input switches 23. The Φrst signal is supplied simultaneously to the CDS modules of the CDS block 20 and thus, the reset values of the pixels PIXEL of the selected scan line are latched simultaneously.

After the Φrst signal is inactivated, an electrical shutter in charge of the corresponding scan line of the pixel array 10 is opened and closed for a predetermined period. If the electrical shutter is closed, a Φsig signal is activated to latch another outputted voltage levels of the individual pixels PIXEL responsive to light during the exposure. The other outputted voltage levels of the individual pixels PIXEL are signal values. Then, the signal input switches 24 are turned on in response to the Φsig signal and, the outputted voltage levels of the pixels PIXEL exposed to the light are stored into the signal capacitors 21 through the signal input switches 23. The Φsig signal is supplied simultaneously to the CDS modules of the CDS block 20 and thus, the signal values of the pixels PIXEL of the selected scan line are latched simultaneously.

It is necessary to turn on the reset output switches 27 and the signal output switches 28 to deliver the reset values and the signal values latched to the individual CDS modules. However, since the individual CDS modules share the output analog buses (i.e., the reset line and the signal line) and are connected to the one differential amplification unit 40, a Φcoli signal including a Φcoli1 signal to a Φcolin signal for turning on the reset output switches 27 and the signal output switches 28 should be turned on sequentially and, the turn-on intervals should not be overlapped. The Φcoli signal turns on the reset output switches 27 and the signal output switches 28 simultaneously and thus, the CDS block 20 latches the reset values and the signal values that are inputted temporally and outputs the rest and signal values simultaneously.

As the Φrst signal is activated, a Crst signal representing a voltage level of the individual reset capacitor 21 is changed into a corresponding reset value level and maintains such reset value level. As the Φsig signal is activated, a Csig signal representing a voltage level of the individual signal capacitor 22 is changed to a signal value level and maintains such signal value level.

While the Φcoli signal is activated, a Φsh1 signal and a Φsh2 signal are activated. The capacitor equalization switches 29 turned on in response to the Φsh1 signal equalize the voltage levels of the reset capacitors 21 (i.e., the Crst signal) and the voltage levels of the signal capacitors 22 (i.e., the Csig signal). The line equalization switch 50 turned on in response to the Φsh2 signal equalizes a rst_bus signal representing a voltage level of the reset line and a sig_bus signal representing a voltage level of the signal line. The rst_bus signal and the sig_bus signal are inputted to the differential amplification unit 40.

The differential amplification unit 40 maintains output signals out1 and out2 having the same voltage level by a Φsh3 signal and then, while the Φsh3 signal is inactivated, the differential amplification unit 40 generates the output signals out1 and out2 whose levels are proportional to an incremental ratio (i.e., the derivative value) of the rst_bus signal and the sig_bus signal. Although not illustrated, a voltage difference between the output signals out1 and out2 is inputted to an analog-to-digital converter (ADC) and converted into a digital signal.

Figure 6:
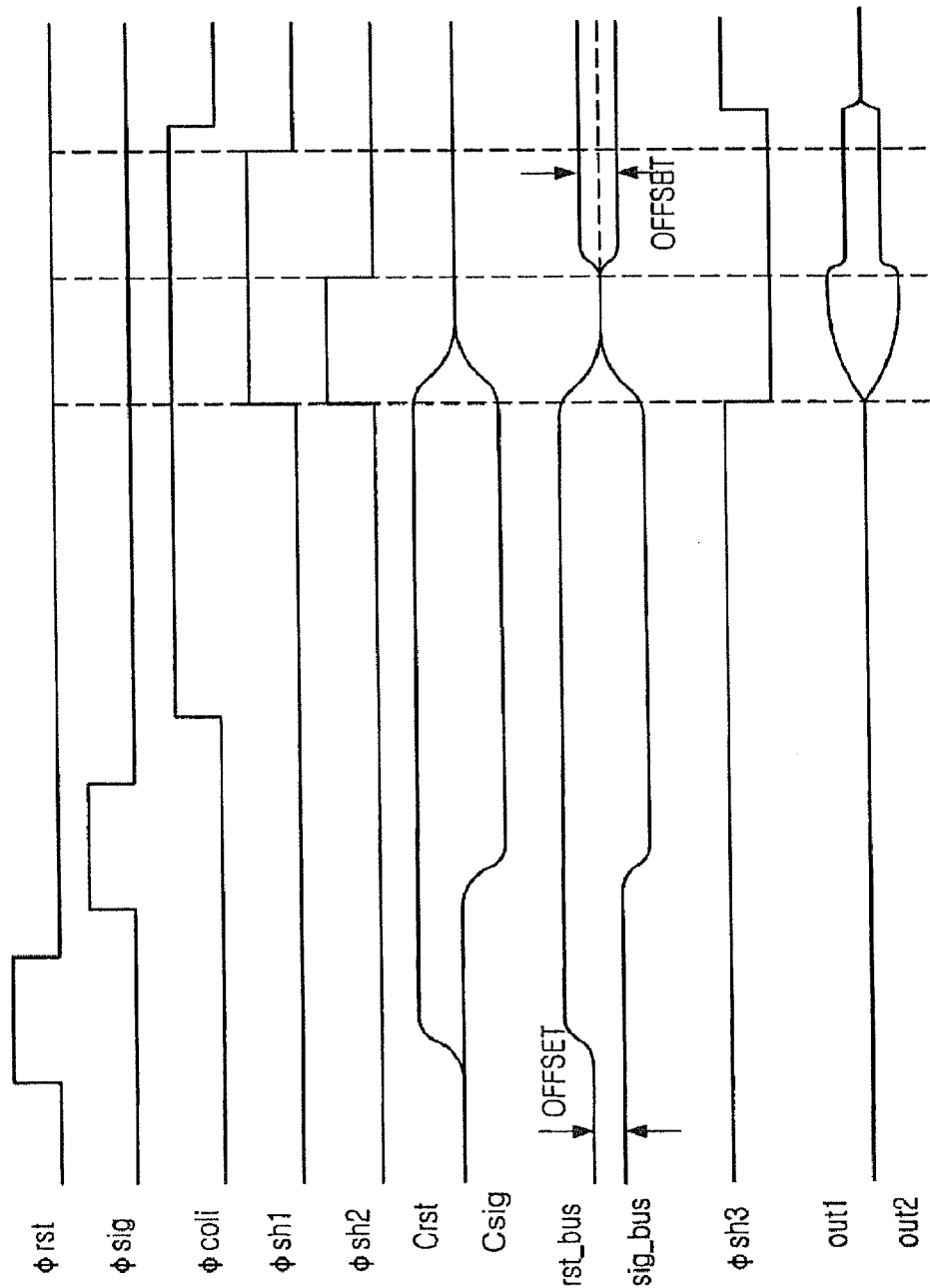
FIG. 6 is a timing diagram showing control signals and output signals in the presence of an offset voltage in the read-out circuit illustrated in FIG. 3.

FIG. 6 is a timing showing control signals and output signals in the presence of an offset voltage in the read-out circuit of the image sensor in accordance with the first embodiment of the present invention. Especially, FIG. 6 shows the elimination of the offset voltage effect by changing operation signals of the read-out circuit.

Although a Φsh1 signal and a Φsh2 signal are activated at the same time, the Φsh2 signal is first inactivated. A rst_bus signal and a sig_bus signal are equalized quickly according to the Φsh2 signal. However, since the Φsh2 signal is inactivated in the middle of activating the Φsh1 signal, the offset voltage is maintained. That is, the above described signal control method makes it possible to increase the response speed of the rst_bus signal and the sig_bus signal representing voltage levels of the reset line and the signal line.

Figure 7:
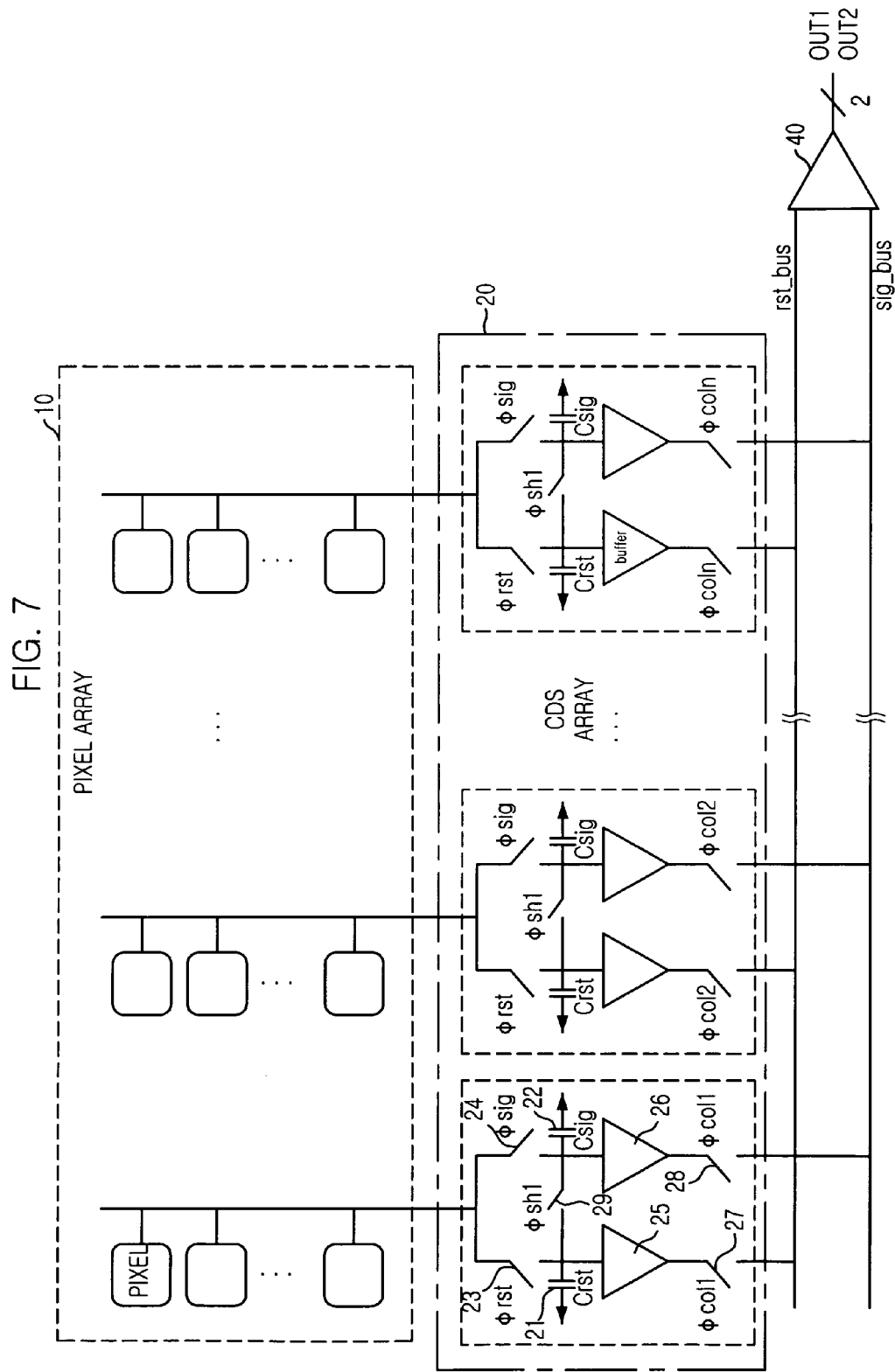
FIG. 7 is a detailed block diagram showing a read-out circuit of an image sensor in accordance with a second embodiment of the present invention.

FIG. 7 is a detailed block diagram illustrating a read-out circuit of an image sensor in accordance with a second embodiment of the present invention.

The read-out circuit of the image sensor includes a CDS block 20. The CDS block 20 includes: a plurality of reset capacitors 21 storing inputted reset values of pixels PIXEL; a plurality of signal capacitors 22 storing inputted signal values of the pixels PIXEL; a plurality of reset buffers 25 outputting the reset values stored at the reset capacitors 21; a plurality of signal buffers 26 outputting the signal values stored at the signal capacitors 22; and a plurality of capacitor equalization switches 29 equalizing electric potentials of the reset capacitors 21 and the signal capacitors 22.

The read-out circuit of the image sensor further includes: a reset line on which reset value output signals of the CDS block 20 are loaded; a signal line on which signal value output signals of the CDS block 20 are loaded; and a differential amplification unit 40 amplifying a difference between the individual reset value output signal and the individual signal value output signal.

Preferably, the CDS block 20 can further include: a plurality of reset input switches 23 inputting the reset values; a plurality of signal input switches 24 inputting the signal values; a plurality of reset output switches 27 outputting the reset values; and a plurality of signal output switches 28 outputting the signal values.

Although not illustrated, the differential amplification unit 40 according to the second embodiment has the same structure as illustrated in FIG. 4, including: a differential amplifier 42 provided with two input terminals and two output terminals; two input capacitors 43 and 44 connected correspondingly to the two input terminals; two feedback capacitors 45 and 46 each connected in between the individual input terminal and the individual output terminal.

Figure 8:
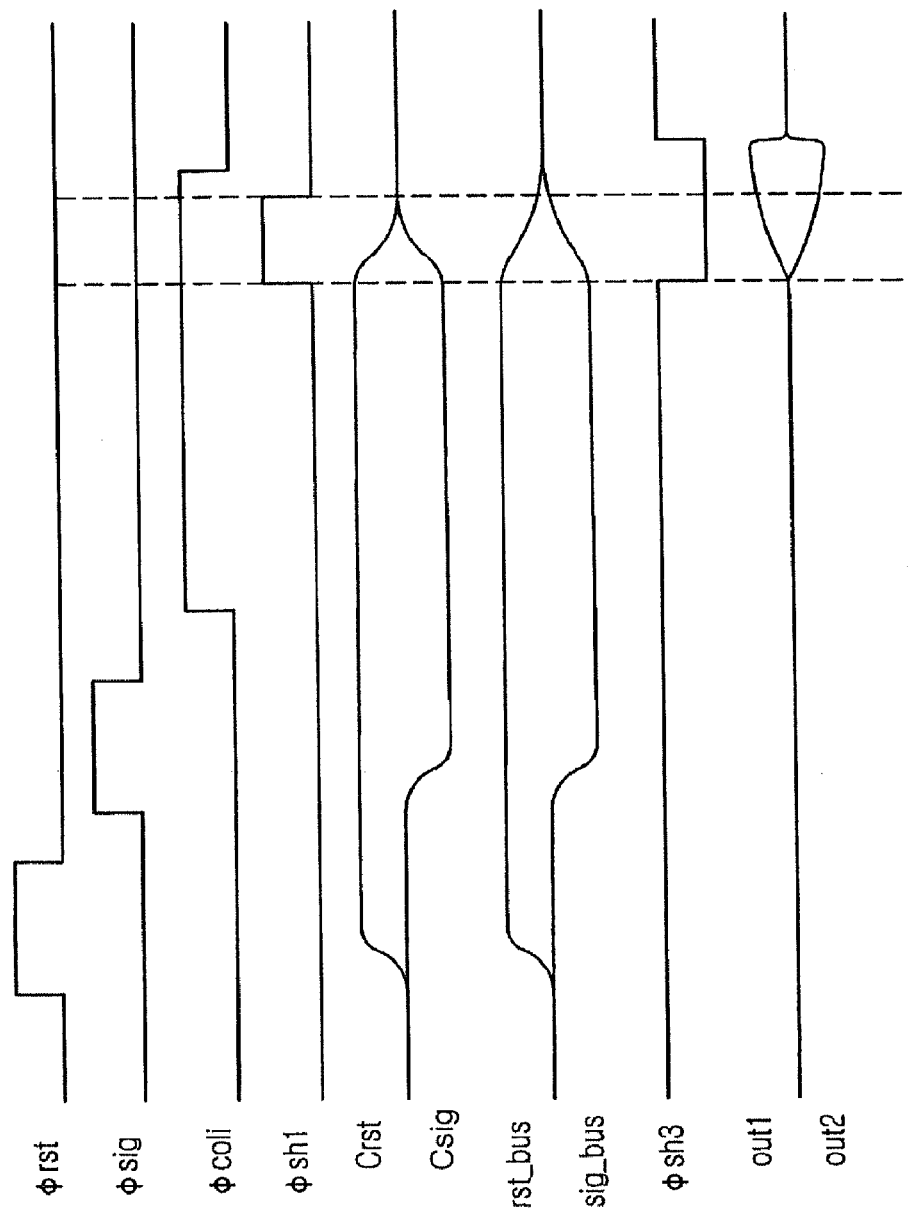
FIG. 8 is a timing diagram showing control signals and output signals in the absence of an offset voltage in the read-out circuit illustrated in FIG. 7.
Figure 9:
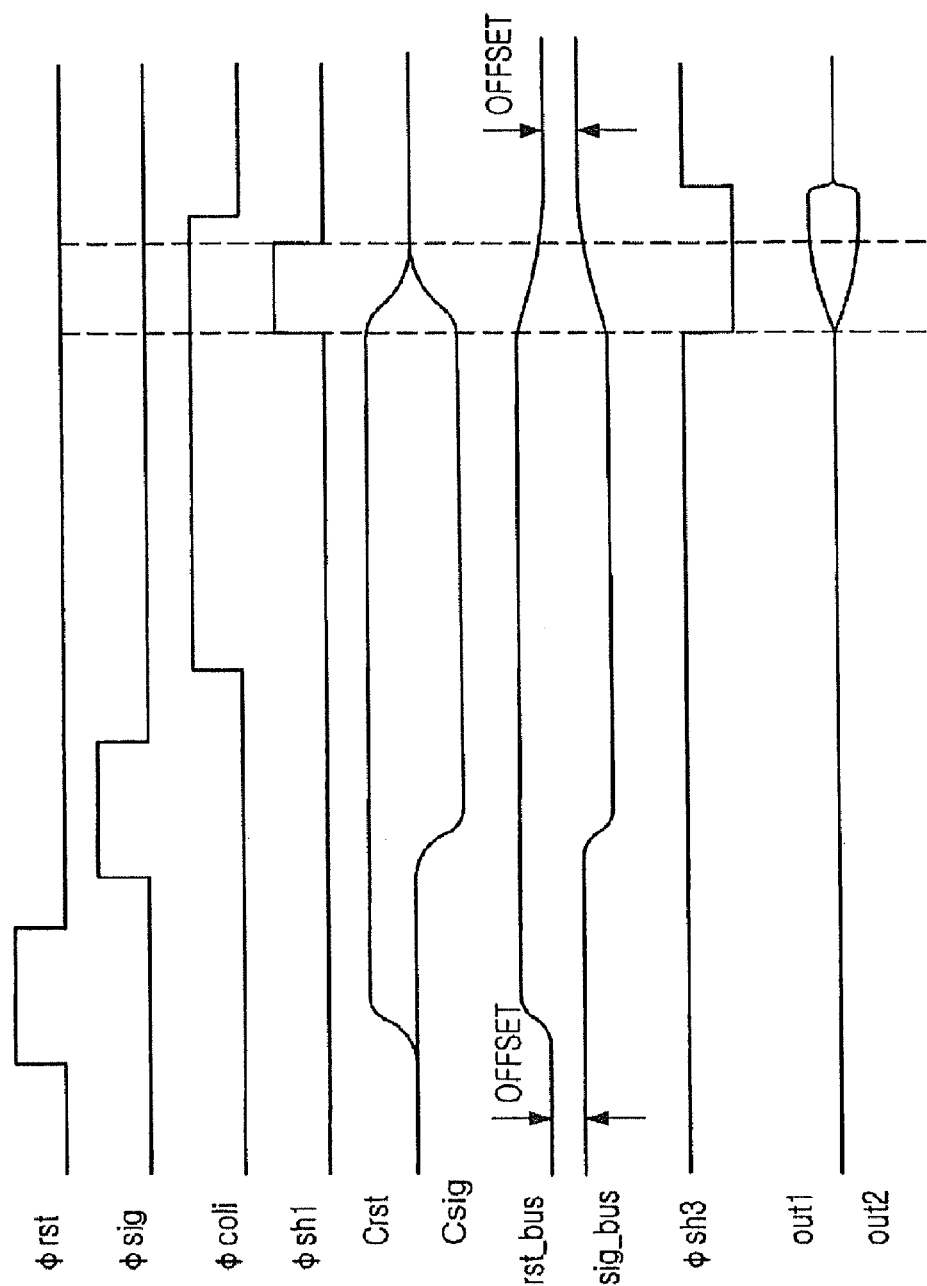
FIG. 9 is a timing diagram showing control signals and output signals in the presence of an offset voltage in the read-out circuit illustrated in FIG. 7.

With reference to FIGS. 8 and 9, operation characteristics of the read-out circuit of the image sensor according to the second embodiment will be described.

FIG. 8 is a timing diagram showing control signals and output signals in the absence of an offset voltage in the read-out circuit of the image sensor. Although the response speed of the analog buses (i.e., the reset line and the signal line) carrying the rst_bus signal and the sig_bus signal is improved compared with the conventional read-out circuit of the image sensor, the response speed of the analog buses according to the second embodiment of the present invention is slightly delayed compared with the first embodiment of the present invention. As illustrated in FIG. 9, the offset voltage effect is eliminated.

Figure 10:
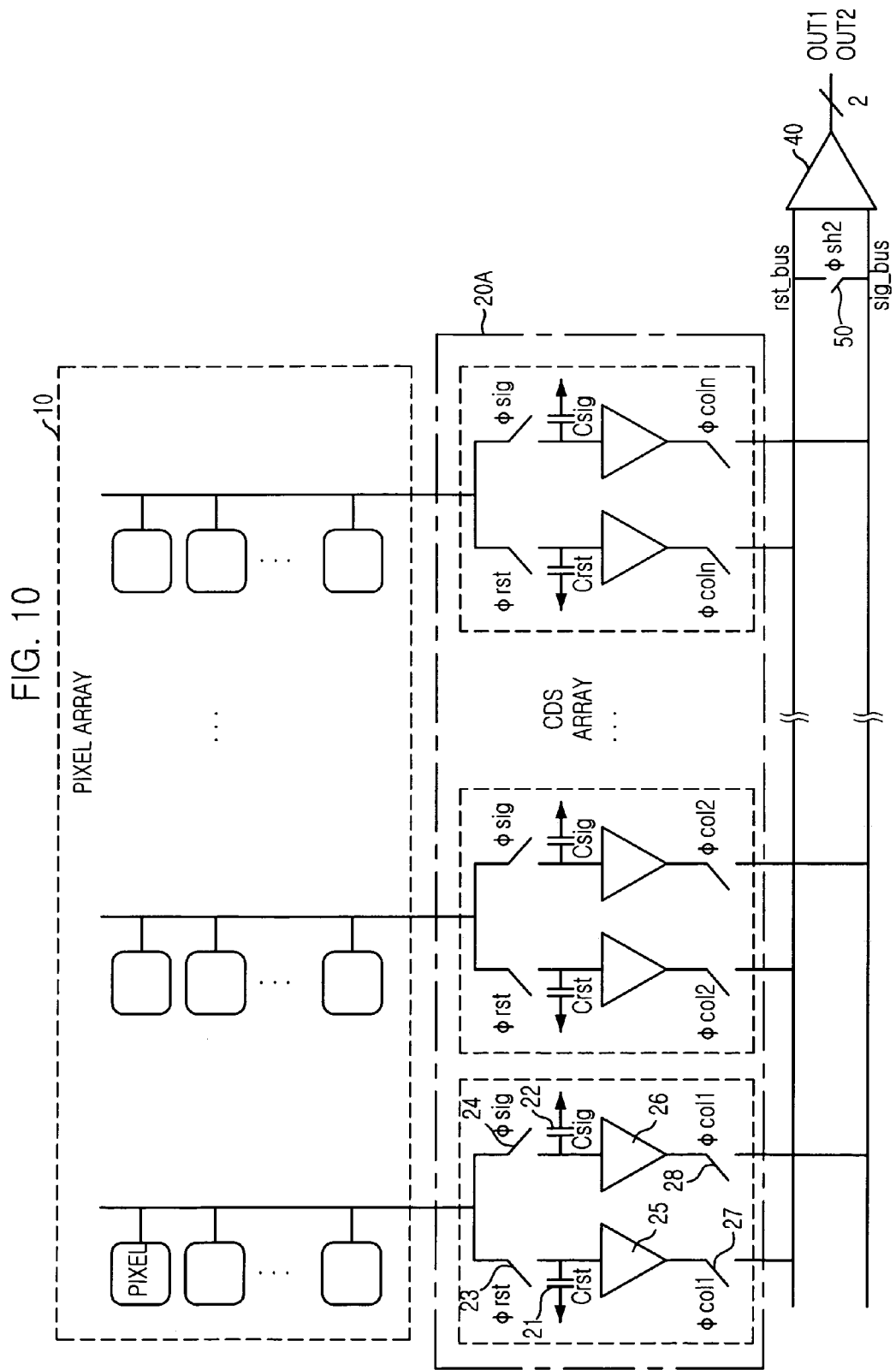
FIG. 10 is a detailed block diagram showing a read-out circuit of an image sensor in accordance with a third embodiment of the present invention.

FIG. 10 is a detailed block diagram showing a read-out circuit of an image sensor in accordance with a third embodiment of the present invention.

The read-out circuit of the image sensor includes a CDS block 20A, wherein the CDS block 20 includes: a plurality of reset capacitors 21 storing inputted reset values of pixels PIXEL; a plurality of signal capacitors 22 storing inputted signal values of the pixels PIXEL; a plurality of reset buffers 25 outputting the reset values stored at the reset capacitors 21; and a plurality of signal buffers 26 outputting the signal values stored at the signal capacitors 22.

The read-out circuit of the image sensor further includes: a reset line on which reset value output signals of the CDS block 20A are loaded; a signal line on which signal value output signals of the CDS block 20A are loaded; a differential amplification unit 40 amplifying a difference between the individual reset value output signal and the individual signal value output signal; and a line equalization switch 50 disposed at an input terminal side of the differential amplification unit 40 and equalizing electric potentials of the reset line and the signal line.

Preferably, the CDS block 20A can further include: a plurality of reset input switches 23 inputting the reset values; a plurality of signal input switches 24 inputting the signal values; a plurality of reset output switches 27 outputting the reset values; and a plurality of signal output switches 28 outputting the signal values.

Although not illustrated, the differential amplification unit 40 according to the third embodiment has the same structure as illustrated in FIG. 4, including: a differential amplifier 42 provided with two input terminals and two output terminals; two input capacitors 43 and 44 connected correspondingly to the two input terminals; two feedback capacitors 45 and 46 each connected in between the individual input terminal and the individual output terminal.

According to the third embodiment, it is possible to improve the response speed of the analog buses including the reset line and the signal line. However, as illustrated in FIG. 11, when an offset voltage exists, it is difficult to correct an error caused by the offset voltage. Although not illustrated, if the offset voltage does not exist, timing of each signal is identical to the timing pattern illustrated FIG. 5 except for the Φsh1 signal.

On the basis of the first to the third embodiments of the present invention, it is possible to eliminate a chance of an error caused by an offset voltage of the analog buses included in the read-out circuit of the image sensor. Also, a response speed of each analog bus is improved without consuming a high level of power.

The present application contains subject matter related to the Korean patent application No. KR 10-2004-0071566, filed in the Korean Patent Office on Sep. 8, 2004, the entire contents of which being incorporated herein by reference.

While the present invention has been described with respect to certain preferred embodiments, it will be apparent to those skilled in the art that various changes and modifications may be made without departing from the spirit and scope of the invention as defined in the following claims.

What is claimed is:

1. An image sensing device comprising:
a pixel sensor;
a first charge storage element configured to store a reset charge received from the pixel sensor;
a second charge storage element configured to store a pixel charge received from the pixel sensor;
an analog bus including a reset line and a pixel line;
a correlated double sampling device (CDS) comprising:
    a first driver configured to receive the reset charge from the first charge storage element and to provide a reset signal on the reset line;
    a second driver configured to receive the pixel charge from second charge storage element and to provide a pixel signal on the pixel line; and
    a CDS equalization device configured to equalize the reset charge stored on the first charge storage element with the pixel charge stored on the second charge storage element;
a line equalization device configured to equalize electric potential levels between the reset line and the pixel line; and
a differential amplification unit including inputs configured to receive the reset line and the pixel line, respectively, and wherein the differential amplification unit is further configured to provide first and second differential analog output signals corresponding to differentiated values of the reset signal and the pixel signal upon concurrent activation of the CDS equalization device and the line equalization device.

2. The image sensing device of claim 1, wherein the CDS equalization device comprises a semiconductor switch connected between the first driver and the second driver.

3. The image sensing device of claim 1, wherein the line equalization device comprises a semiconductor switch connected between the reset line and the pixel line of the analog bus.

4. The image sensing device of claim 1, wherein the CDS equalization device and the line equalization device are configured for concurrent activation.

5. The image sensing device of claim 1, wherein:
the line equalization device is deactivated after a first predetermined delay time; and
the CDS equalization device is deactivated after a second predetermined delay time, wherein the second predetermined delay time is greater than the first predetermined delay time.

6. The image sensing device of claim 1, further comprising an output equalization device connected between the first and second analog output signals of the differential amplification unit and configured to equalize the first and second analog output signals.

7. The image sensing device of claim 6, wherein the CDS equalization device is configured to initiate equalization at a predetermined time during a read out of the pixel sensor, wherein the line equalization device is configured to initiate equalization at the predetermined time, and wherein the output equalization device is configured to deactivate equalization at the predetermined time.

8. An image sensing device, comprising:
a plurality of pixel sensors;
an analog bus comprising an analog reset line and an analog pixel line;
a correlated double sampling (CDS) block, comprising:
    a plurality of reset capacitors configured to store reset signals provided from the plurality of pixel sensors;
    a plurality of pixel capacitors configured to store pixel signals provided from the plurality of pixel sensors;
    a plurality of reset driving devices configured to provide the reset signals from the plurality of reset capacitors to the analog reset line of the analog bus;
    a plurality of pixel signal driving devices configured to provide the pixel signals from the plurality of pixel capacitors to the analog pixel line of the analog bus; and
    a plurality of capacitor equalization devices configured to equalize electric potential levels between the reset signal stored on each reset capacitor of the plurality of reset capacitors with the pixel signal stored on each respective pixel capacitor of the plurality of pixel capacitors;
a line equalization device configured to equalize electric potential levels between the analog reset line and the analog pixel line; and
a differential amplification unit including inputs configured to receive the reset signals from the analog reset line and to receive the pixel signals from the analog pixel line, wherein the differential amplification unit is further configured to provide first and second differential analog output signals corresponding to differentiated values of the reset signal and the pixel signal of a given pixel upon concurrent activation of a corresponding capacitor equalization device and the line equalization device.

9. The image sensing device of claim 8, wherein the CDS block further comprises:
a plurality of reset output switches configured to transfer the reset signals to the analog reset line; and
a plurality of pixel signal output switches configured to transfer the pixel signals to the analog pixel line.

10. The image sensing device of claim 8, wherein the plurality of reset driving devices and the plurality of pixel signal driving devices comprise source followers each including two metal-oxide semiconductor (MOS) transistors.

11. The image sensing device of claim 8, wherein the differential amplification unit comprises:
- a differential amplifier comprising first and second input terminals and first and second output terminals;
- a first capacitor connected between the analog pixel line and the first input terminal of the differential amplifier;
- a second capacitor connected between the analog reset line and the second input terminal of the differential amplifier;
- a first feedback capacitor connected between the first input terminal of the differential amplifier and the first output terminal of the differential amplifier; and
- a second feedback capacitor connected between the second input terminal of the differential amplifier and the second output terminal of the differential amplifier.

12. The image sensing device of claim 8, wherein the plurality of capacitor equalization devices comprise MOS transistor switches.

13. The image sensing device of claim 8, wherein the line equalization device comprises a MOS transistor switch.

14. The image sensing device of claim 8, wherein the plurality of capacitor equalization devices and the line equalization device are deactivated at different times during an overlapping time period after the reset signal and the pixel signal are provided on the analog bus to the differential amplification unit.

15. The image sensing device of claim 8, wherein:
- the line equalization device is deactivated after a first predetermined delay time during a read out of a given pixel sensor; and
- the plurality of capacitor equalization devices are deactivated after a second predetermined delay time during the read out of the given pixel sensor, wherein the second predetermined delay time is greater than the first predetermined delay time.

16. The image sensing device of claim 8, further comprising an output equalization device connected between the outputs of the differential amplification unit and configured to equalize the analog output signals.

17. The image sensing device of claim 16, wherein the CDS equalization device is configured to initiate equalization at a predetermined time during a read out of the pixel sensor, wherein the line equalization device is configured to initiate equalization at the predetermined time, and wherein the output equalization device is configured to deactivate equalization at the predetermined time.

18. An image sensing device comprising:
- a pixel sensor;
- an analog bus including a reset line and a pixel line;
- a correlated double sampling (CDS) circuit having a first input configured to receive a pixel signal from the pixel sensor, a first output configured to provide the pixel signal to the pixel line of the analog bus, a second input configured to receive a reset signal from the pixel sensor, and a second output configured to provide a reset signal to the reset line of the analog bus;
- a CDS equalization device configured to equalize electric potential levels between the pixel signal and the reset signal at the first input and the second input of the CDS circuit;
- a line equalization device configured to equalize electric potential levels between the reset line and the pixel line of the analog bus; and
- a differential amplification unit having a first input receiving the reset signal from the reset line and a second input receiving the pixel signal from the pixel line, wherein the differential amplification unit is configured to provide first and second differential analog output signals corresponding to differentiated values of the reset signal and the pixel signal upon concurrent activation of the CDS equalization device and the line equalization device.

19. The image sensing device of claim 18, further comprising an output equalization device connected between the first and second analog output signals of the differential amplification unit to equalize the first and second analog output signals.

20. The image sensing device of claim 19, wherein the CDS equalization device is configured to initiate equalization at a predetermined time during a read out of the pixel sensor, wherein the line equalization device is configured to initiate equalization at the predetermined time, and wherein the output equalization device is configured to deactivate equalization at the predetermined time.

21. The image sensing device of claim 18, wherein the CDS circuit comprises:
- a first storage device configured to store the pixel signal from the pixel sensor at the first input of the CDS circuit; and
- a second storage device configured to store the reset signal from the pixel sensor at the second input of the CDS circuit.

22. The image sensing device of claim 21, wherein the CDS equalization device comprises a switch selectively connecting the first storage device and the second storage device.

23. The image sensing device of claim 18, wherein the CDS equalization device and the line equalization device are deactivated at different times during an overlapping time period after the reset signal and the pixel signal are provided on the analog bus to the differential amplification unit.

24. The image sensing device of claim 18, wherein:
- the line equalization device is deactivated after a first predetermined delay time; and
- the CDS equalization device is deactivated after a second predetermined delay time during read out of the pixel sensor, wherein the second predetermined delay time is greater than the first predetermined delay time.

* * * * *